US008655990B2

(12) United States Patent
Zhu et al.

(10) Patent No.: US 8,655,990 B2
(45) Date of Patent: Feb. 18, 2014

(54) ACCESS DEVICE ROUTING DEVICE AND METHOD THEREOF SUPPORTING STATELESS ADDRESS CONFIGURATION COMMUNICATION NETWORK

(75) Inventors: Keyao Zhu, Shanghai (CN); Haibo Wen, Shanghai (CN); Renxiang Yan, Shanghai (CN); Yinglan Jiang, Shanghai (CN); Fanxiang Bin, Shanghai (CN); Qingshan Zhang, Shanghai (CN)

(73) Assignee: Alcatel Lucent, Paris (FR)

( * ) Notice: Subject to any disclaimer, the term of this patent is extended or adjusted under 35 U.S.C. 154(b) by 363 days.

(21) Appl. No.: 11/995,499

(22) PCT Filed: May 19, 2006

(86) PCT No.: PCT/CN2006/001032
§ 371 (c)(1),
(2), (4) Date: May 28, 2008

(87) PCT Pub. No.: WO2007/006195
PCT Pub. Date: Jan. 18, 2007

(65) Prior Publication Data
US 2008/0244090 A1    Oct. 2, 2008

(30) Foreign Application Priority Data
Jul. 13, 2005    (CN) .......................... 2005 1 0027706

(51) Int. Cl.
G06F 15/177    (2006.01)
(52) U.S. Cl.
USPC ........................................................ 709/221
(58) Field of Classification Search
USPC .................................................. 709/221, 201
See application file for complete search history.

(56) References Cited

U.S. PATENT DOCUMENTS

| 7,266,090 B2 * | 9/2007 | Sawada et al. ................ 370/254 |
| 2004/0073600 A1 * | 4/2004 | Elo et al. ........................ 709/201 |
| 2005/0117590 A1 * | 6/2005 | Ronneke ................... 370/395.52 |

FOREIGN PATENT DOCUMENTS

| CN | 1571423 | 1/2005 |
| JP | 2005064570 | 3/2005 |

(Continued)

OTHER PUBLICATIONS

European Search Report dated Feb. 24, 2010, issued in corresponding Application No. EP 06741920.

(Continued)

*Primary Examiner* — Noel Beharry
*Assistant Examiner* — Farhad Ali
(74) *Attorney, Agent, or Firm* — Harness, Dickey & Pierce

(57) ABSTRACT

The present invention relates to an IPv6-based access device, edge router and method for stainless address configuration for IPv6 user equipment in an Ethernet access network, wherein, the access device adds the relay agent ID indicating the access device itself and the relevant port identifier indicating the user equipment to a router solicitation message sent by the user equipment in the form of a newly defined option, and forwards the message to the relevant edge router; and the edge router configures a dedicated address prefix for the user equipment according to the relay agent ID and port identifier, combines the address prefix, the relay ID and the port identifier into a router response message, and sends the response message to the relevant access equipment indicated by the relay ID; the access device sends a router advertisement message only including the address prefix via the line port indicated by the port identifier to user equipment. By allocating the dedicated address prefix to every data subscriber line for IPv6 service, IPv6 stainless address configuration is achieved to solve the security and scalability problems in the prior art.

10 Claims, 7 Drawing Sheets

(56) References Cited

FOREIGN PATENT DOCUMENTS

| WO | WO 02/065726 A2 | 8/2002 |
| WO | WO 2005/008994 A1 | 1/2005 |

OTHER PUBLICATIONS

Ralph Droms, Cisco Systems Wing Cheong Lau Qualcomm: "DHCPv6 Relay Agent Information Option; draft-droms-dhc-v6-relayopt-00.tx." IETF Standard-Working-Draft, Internet Engineering Task Force, IETF, CH, pp. 1-9. Oct. 1, 2004, XP015037780, ISSN: 0000-0004.

Volz Cisco Systems B et al.: "DHCPv6 Relay Agent Remote ID Option; draft-volz-dhc-dhcpv6-remoteid-00.t" IETF Standard-Working-Draft, Internet Engineering Task Force, IETF, CH, Dec. 20, 2004, pp. 3-4, XP015039813, ISSN: 000-0004.

Joo-Chul Lee et al.: "Implementation of IPv6 prefix delegation mechanism using DHCPv6 protocol," Advanced Communication Technology, 2005, ICACT 2005. The $7^{th}$ International Conference on Phoenix Park, Korea, Feb. 21-23, 2005, Piscataway, NJ, USA, IEEE, vol. 1, No. 7, Feb. 21, 2005, pp. 635-637, XP010813718, ISBN: 978-89-5519-123-3.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|                           Reserved                            |
+-+-+-+-+-+-+-+-+-+-+-+-+-+-+-+-+-+-+-+-+-+-+-+-+-+-+-+-+-+-+-+-+
|   Options ...
+-+-+-+-+-+-+-+-+-+-+-+-+
```

Prior Art

Fig. 2A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
| Cur Hop Limit |M|O|  Reserved |       Router Lifetime         |
+-+-+-+-+-+-+-+-+-+-+-+-+-+-+-+-+-+-+-+-+-+-+-+-+-+-+-+-+-+-+-+-+
|                        Reachable Time                         |
+-+-+-+-+-+-+-+-+-+-+-+-+-+-+-+-+-+-+-+-+-+-+-+-+-+-+-+-+-+-+-+-+
|                       Retransmission Timer                    |
+-+-+-+-+-+-+-+-+-+-+-+-+-+-+-+-+-+-+-+-+-+-+-+-+-+-+-+-+-+-+-+-+
|   Options ...
+-+-+-+-+-+-+-+-+-+-+-+-+-
```

Prior Art

Fig. 2B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |              ...              |
+-+-+-+-+-+-+-+-+-+-+-+-+-+-+-+-+-+-+-+-+-+-+-+-+-+-+-+-+-+-+-+-+
```

Prior Art

Fig. 2C

ACCESS DEVICE ROUTING DEVICE AND METHOD THEREOF SUPPORTING STATELESS ADDRESS CONFIGURATION COMMUNICATION NETWORK

FIELD OF THE INVENTION

The present invention relates to an access network, and in particular, to a device and method of implementing address configuration in an access network.

BACKGROUND OF THE INVENTION

IPv6 stateless configuration is considered a configuration manner newly defined in the IPv6 protocol, by which flexible configuration of a terminal can be achieved and plug&play of a terminal device is made possible.

FIG. 1 shows a schematic view of an access network architecture supporting IPv6 user equipment, in which there are comprised a plurality of user equipment (only user equipment 3 is shown for simplicity), an access device (or access node) 1 and a router 2. Among them, access device 1 can be a layer 2 device with some layer 3 functionalities. A typical such device is IPDSLAM (IP Digital Subscriber Line Access Multiplexer). Router 2 can be an IPv6 protocol-based edge router (IPv6 BRAS/Edge Router).

In the standard IPv6 stateless configuration, user equipment 3 first generates a local link transfer address by itself, and then multicasts, by taking the address as a source address, address configuration information called router solicitation (RS) via access device 1 to all routers 2 on the local link. Router 2 responds to the solicitation with a router advertisement (RA) message which contains an aggregate global unicast transfer address prefix and other relevant configuration information. User equipment 3 combines the global address prefix which it gets via access device 1 from router 2 and an interface identifier generated by itself to generate a global address automatically. And through repeated address detection, user equipment 3 can communicate with other user equipment on the Internet. Using stateless configuration, IP addresses of all hosts within a network can be changed without manual intervention.

However, IPv6 stateless configuration, which was generated in open network applications, goes on the premise that neighboring nodes trust each other. Directly applying this mechanism in an access network will cause security and scalability problems of the access network, especially for a layer 2 access device or an enhanced layer 2 access device with some layer 3 functionalities. Detailed description will be given below.

Applying the standard IPv6 stateless configuration mechanism in an access network will cause the following problems:

1. Potential security problem: in stateless configuration, when multiple DSL lines share the same prefix, malicious user equipment could easily spoof IP addresses by directly getting the advertised prefix. It is almost impossible for access device 1 to support an anti-spoofing filter since no address state information has been maintained at access device 1.

2. Potential scalability problem: when access device 1 receives a RA from edge router 2, it has to relay this RA message to all DSL line users. This is because that access device 1 has no knowledge which DSL line the RA message is targeting to. As the number of broadband users keeps increasing, relaying the RA message to all DSL line ports could cause certain performance problem which may eventually have side effect on the scalability of access device 1.

In order improve security and scalability, it is preferred that edge router 2 advertises a dedicated address prefix to each DSL line. Thus, 1) access device 1 could easily realize an IP address anti-spoofing filter by inspecting the prefix of a packet's source and 2) access device 1 could avoid the scalability problem by only relaying the RA message from edge router 2 to a particular DSL line.

The technical problem to be solved in the prior art is how to support such configuration of allocating one address prefix for each DSL line configuration in a broadband access network employing a layer 2 access device with some layer 3 functionalities.

In an existing layer 2 access network, both VLAN-based cross-connected mode and MAC address-based bridge mode can be employed in data forwarding. For the technical problem described above, one existing solution is that access device 1 may operate in cross-connected mode, VLAN (virtual local area network) is configured to identify and separate traffic or information (e.g. RS message) from different DSL lines. At IPv6-based edge router 2, the RA message containing a particular address prefix will be only sent to the DSL line identified by a certain VLAN. In cross-connected mode, no modification is needed in access device 1. Here, cross-connect mode means that the user's VLAN information could be maintained at network side and different customers will not share the same VLAN identifier.

Since the number of VLAN identifiers is limited (<=1024 VLANs) (an access network can support at most 1024 VLANs), it would be impossible for an access network to support one VLAN identifier per a DSL line when there are a large number of DSL lines in the access network. VLAN stacking is an alternative solution to solve the scalability problem of standard VLAN solution. By using VLAN stacking, it is possible to scale up to support 1024*1024 distinct VLANs. Unfortunately, VLAN stacking has not been standardized, and thus is not supported by all access devices and Ethernets.

When access device 1 operates in bridge mode, since DSL line identifiers cannot be transferred to network side, edge router 2 cannot allocate a particular address prefix for each DSL line correctly. Here, bridge mode means that since the DSL line information of user equipment cannot be maintained at network side, it is impossible to effectively distinguish different user equipment.

The present invention is proposed to solve the aforesaid problems in the prior art.

SUMMARY OF THE INVENTION

It is an object of the invention to provide a technical solution that enables an access node in bridge-mode to support one-address prefix-per-line IPv6 stateless configuration in an access network. By adding a relay-agent port identifier option in RS and RA messages, an IPv6 edge router can get the ID information of a DSL line and use the information to allocate a proper IPv6 address prefix for each DSL user.

The VLAN (or VLAN-stacking) approach realizes one-address prefix-per-line using Ethernet technology. This requires all Ethernet devices between the user equipment and the edge router support the VLAN mechanism and the access node needs to operate in cross-connect mode.

The present invention realizes one-address prefix-per-line using IP technology, i.e., by encapsulating the DSL line ID information into RA and RS messages. This solution allows the access node to operate in bridge mode or one VLAN to be shared between different users. But this solution requires both the access node and the edge router should support this RS/RA extension.

According to a first aspect of the present invention, there is provided a method for address configuration in an access device in an IPv6 protocol supported communication network, the method comprising: receiving a user solicitation message from user equipment; adding user identification information identifying the user equipment to the user solicitation message, to generate a solicitation message to which the user identification information is added; and sending the solicitation message to which the user identification information is added to a router.

Preferably, the method further comprises the steps of: receiving a router response message from the router; separating address prefix information and the user identification information from the router response message; and sending the address prefix information to corresponding user equipment in accordance with the user identification information.

According to a second aspect of the present invention, there is provided an access device for address configuration for user equipment in an IPv6 protocol supported communication network, the access device comprising: first reception means for receiving a user solicitation message from user equipment; message combination means for adding user identification information identifying the user equipment to the user solicitation message, to generate a solicitation message to which the user identification information is added; and first sending means for sending the solicitation message to which the user identification information is added to an edge router.

Preferably, the access device further comprises: second reception means for receiving a router response message from the router; message separation means for separating address prefix information and the user identification information from the router response message; and second sending means for sending the address prefix information to corresponding user equipment in accordance with the user identification information.

According to a third aspect of the present invention, there is provided a method for address configuration in a routing device of an IPv6 protocol supported communication network, the method comprising: receiving a user solicitation message from an access device; separating user identification information from the user solicitation message; allocating a user-specific address prefix based on the user identification information; adding the user-specific address prefix and the user identification information to a router response message; and sending the router response message to which the user identification information and the specific address prefix are added to the access device.

According to a fourth aspect of the present invention, there is provided a routing device for address configuration for user equipment in an IPv6 protocol supported communication network, the routing device comprising: reception means for receiving a user solicitation message from an access device; message separation means for separating user identification information from the user solicitation message; allocation means for allocating a user-specific address prefix based on relay agent identification (ID) and a port identifier; message combination means for adding the user-specific address prefix, the relay agent identification and the port identifier to a router response message; and sending means for sending the router response message to which user identification information and specific address prefix are added, to the access device.

Compared with the prior art, the present invention achieve stateless address configuration for IPv6 service by allocating a dedicated address prefix for each data subscriber line, thereby solving the security and scalability problem caused by applying the solution of the prior art to an access network directly. It allows an access device to operate in bridge mode when the VLAN (VLAN stacking) is not supported by the access device and an EMAN network or when multiple lines share the same VLAN. Furthermore, the present invention makes no modification to user equipment. User equipment can directly employ the standard IPv6 protocol stack.

BRIEF DESCRIPTION ON THE DRAWINGS

Hereinafter, detailed description will be given to the present invention with reference to the accompanying drawings in which like or similar reference numerals denote the same components:

FIG. 1 is a schematic view an IPv6 standard-based layer 2 access network architecture in the prior art;

FIGS. 2A-C are schematic views of a router solicitation message format, a router advertisement message format and a message additional option format in the prior art;

DESCRIPTION OF THE PREFERRED EMBODIMENTS

The present invention will be described in detail with reference to the accompanying drawings and in terms of concrete embodiments. It is to be understood that the present invention is not limited to these concrete embodiments.

Figure 1:
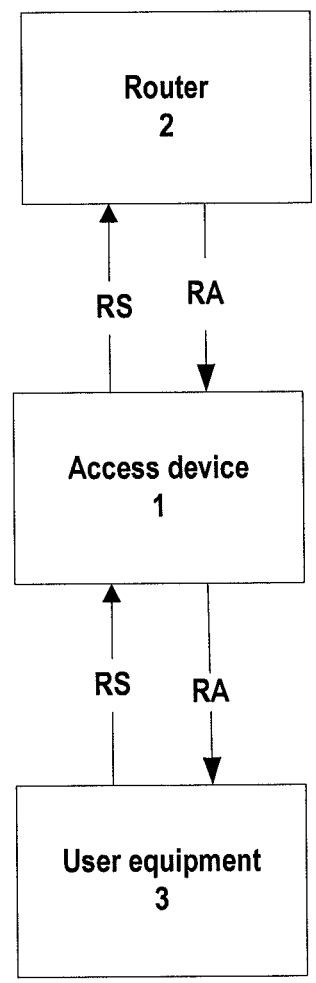

FIGS. 2A-2B show schematic views of message formats of a user solicitation message (e.g. router solicitation (RS) message) from user equipment 3 shown in FIG. 1 and a router response message (e.g. router advertisement (RA) message) from router 2 shown in FIG. 1. Both of these two messages belong to the IPv6 neighbor discovery protocol and are encapsulated in an ICMPv6 packet.

As shown in FIG. 2A, in the RS message, the $1^{st}$ byte is used for indicating type; the $2^{nd}$ byte is used for indicating code; the $3^{rd}$-$4^{th}$ bytes are checksum; the $5^{th}$-$8^{th}$ bytes are reserved bytes; and subsequent bytes are options.

As shown in FIG. 2B, in the RA message, the $1^{st}$ byte is used for indicating type; the $2^{nd}$ byte is used for indicating code; the $3^{rd}$-$4^{th}$ bytes are checksum; the $5^{th}$ byte is Cur Hop Limit; in the $6^{th}$ byte, the $1^{st}$ bit denotes M, the $2^{nd}$ bit denotes O, and the $3^{rd}$-$8^{th}$ bits are used for reservation; the $7^{th}$-$8^{th}$ bytes denote router lifetime; the $9^{th}$-$12^{th}$ bytes denote reachable time; the $13^{th}$-$16^{th}$ bytes denote retransmission timer; and subsequent bytes are options.

Formats of options in the RS/RA message are as follows:

IPv6 Neighbor Discovery messages (including RS and RA messages) include zero or more options, some of which may appear multiple times in the same message. All options are of the form shown in FIG. 2C:

wherein,

Type: the type is an 8-bit identifier. The RFC 2461 standard has defined the type of option as shown in Table 1:

TABLE 1

| Option Name | Type |
| --- | --- |
| Source Link-Layer Address | 1 |
| Target Link-Layer Address | 2 |
| Prefix Information | 3 |
| Redirected Header | 4 |
| MTU (Maximum Transmission Unit) | 5 |

Length: 8-bit unsigned integer. The length of the option (including the fields of type and length) is in units of 8 bytes. The value 0 is invalid. Access device 1 must discard an ND packet that contains an option with the value 0 of length.

As mentioned previously, there are 5 option types defined in the RFC 2461 standard. In order to implement the present invention, we propose a new option type, the format of which is as shown in Table 3:

| Option Name | Type |
| --- | --- |
| Relay Agent Option | 6 |

Figure 3:
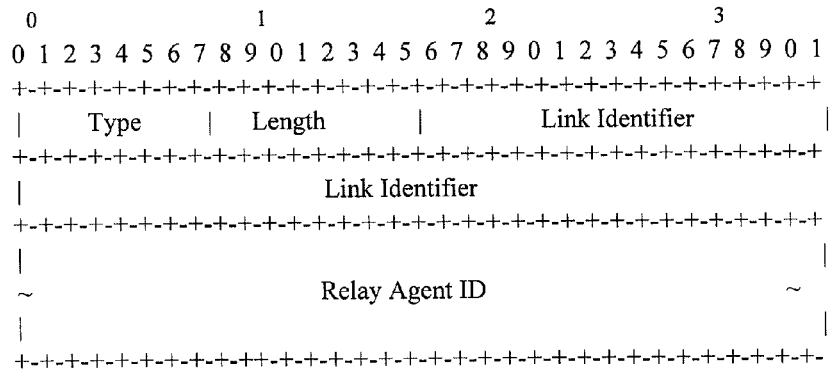
FIG. 3 is a schematic view of an option format to which router solicitation and advertisement messages can be added according to an embodiment of the present invention.

A concrete message format thereof is as shown in FIG. 3, wherein,

Type: 6

Length: 3 (in units of 8 bytes)

Link Identifier This field uniquely identifies a line (port) under an access device. In a DSL access network, the MAC address of each DSL line port can be used as the identifier. If the DSL line port does not have a MAC address, any other local unique layer 2 identifier can be used by the access node as the identifier.

Relay Agent ID: This field uniquely identifies an RS/RA message relay agent (i.e., an access device). In an IPv6 access network, this filed can employ the IPv6 address (or any other layer 2 or 3 identifier) of the access node used by the service provider for the purpose of network management.

Figure 4:
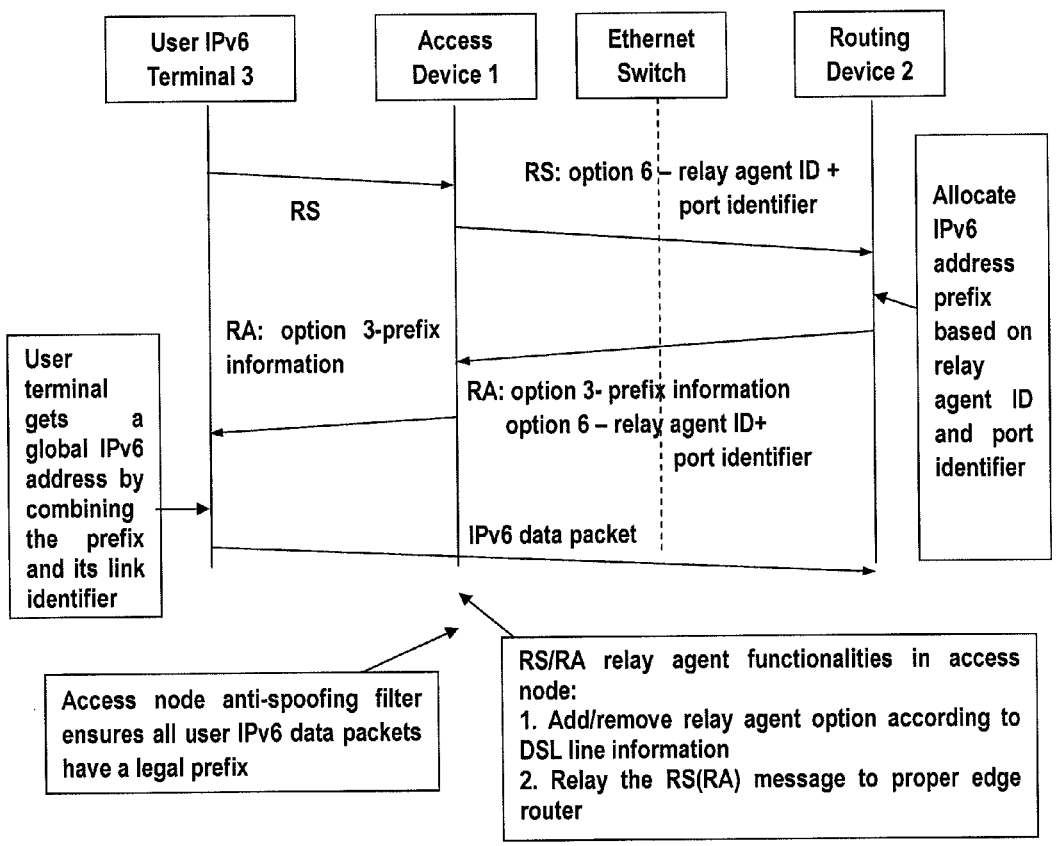
FIG. 4 is a schematic view of stateless address configuration for user equipment in an IPv6 standard-based layer 2 access network architecture according to an embodiment of the present invention.

FIG. 4 is a schematic view of RS/RA solutions for IPv6 stateless configuration in an IPv6-based communication network which employs Ethernet access device (access node) 1 with some IP layer functionalities.

FIG. 4 shows RS/RA agent solutions for layer 2 Ethernet access device (access node) 1 with some layer 3 (IP layer) functionalities so as to support IPv6 stateless configuration.

Specifically, FIG. 4 shows one (IPv6 protocol supported) user equipment 3, one access device (Ethernet access device with some IP layer functionalities) 1 and one routing device (e.g. IPv6 edge router) 2.

First, user equipment 3 sends a user solicitation message (e.g. a router solicitation (RS) message defined in RFC 2461) to access device 1.

Then, access device 1 adds to the RS message user identification information for identifying the user, which contains the relay agent ID representing access device 1 and the port identifier corresponding to user equipment 3. Access device 1 sends to routing device 2 the RS message to which the user identification information was added.

Routing device 2 separates the user identification message (including relay agent ID of access device 1 and the port identifier corresponding to user equipment 3) from the received RS message, allocates a particular address prefix (e.g. IPv6 address prefix) based on the relay agent ID and the port identifier, and contains the information (the relay agent ID, the port identifier and the corresponding particular address prefix) in a router response (e.g. a router advertisement (RA) message defined in RFC 2461). As shown in FIGS. 2 and 3, in RS and RA messages defined in RFC 2461, option 3 contains the address prefix information, and option 6 contains the relay agent ID and the port identifier. Subsequently, routing device 2 sends the RA message to the access device 1 corresponding to the relay agent ID.

Access device 1 separates from the RA message option 3 which contains the particular address prefix information and option 6 which contains the relay agent ID and the port identifier. Based on the relay agent ID and the line port which the port identifier indicates, and after option 6 is removed from the RA message, the RA message from which option 6 was removed is sent to user equipment 3 via the line port which the port identifier represents.

As shown in FIGS. 2, 3 and 4, by adding to RS/RA the relay agent ID of access device 1 and the port information corresponding to the DSL line (e.g. as shown in FIGS. 2-3, a new option 6 is added to the RS/RA message), routing device 2 (e.g. edge router) can allocate a dedicated address prefix for each user equipment 3 (or DSL), and access device 2 can avoid the scalability problem which might be caused by flooding the RA message to all DSL lines, and implement pre-prefix-IP address-based anti-spoofing filter (security).

Figure 5:
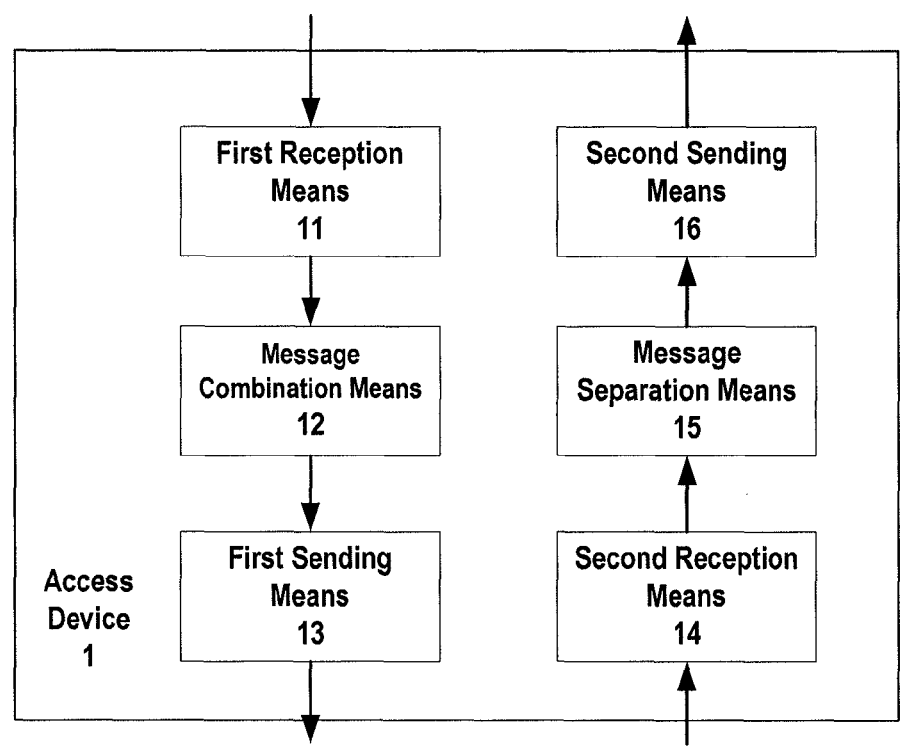
FIG. 5 is a block diagram of an access device implementing address configuration for user equipment in an access network according to an embodiment of the present invention.

FIG. 5 shows an access device 1 implementing address configuration for user equipment in an IPv6 protocol-based communication network according to an embodiment of the present invention, which comprises first reception means 11, message combination means 12, first sending means 13, second reception means 14, message separation means 15, and second sending means 16.

First reception means 11 is for receiving a user solicitation message (e.g. a router solicitation (RS) message defined in RFC 2461) from user equipment.

Message combination means 12 is for adding user identification information to the user solicitation message, wherein the user identification information may contain relay agent ID representing the access device 1 and a port identifier corresponding to the user equipment (or DSL).

First sending means 13 is for sending the user solicitation message, to which the user identification information was added, to a routing device (e.g. edge router).

Second reception means 14 is for receiving a router response message (e.g. a router advertisement (RA) message defined in RFC 2461) from the routing device, which RA message contains user identification information (may contain a port identifier only or relay agent ID and a port identifier) and a particular address prefix (e.g. IPv6 address prefix) corresponding to the user equipment.

Message separation means 15 is for separating from the router response message the user identification information and the particular address prefix information. As described previously, the user identification information at least includes a port identifier for identifying the user equipment (or DSL).

Second sending means 16 is for, based on the user identification information, sending the particular address prefix information via a port indicated by the port identifier to the corresponding user equipment.

Preferably, access device 1 is a layer 2 access device with some layer 3 functionalities, and more preferably, is an Ethernet access device.

Preferably, message combination means 12 and message separation means 13 (which separates a user identification message from a router solicitation message and combines the former with the latter) can be implemented by adding the solution of option 6 shown in FIG. 3 to an IP neighbor discovery message (RS/RA message) defined in RFC 2461 as shown in 2A-2C or separating the former from the latter.

Figure 6:
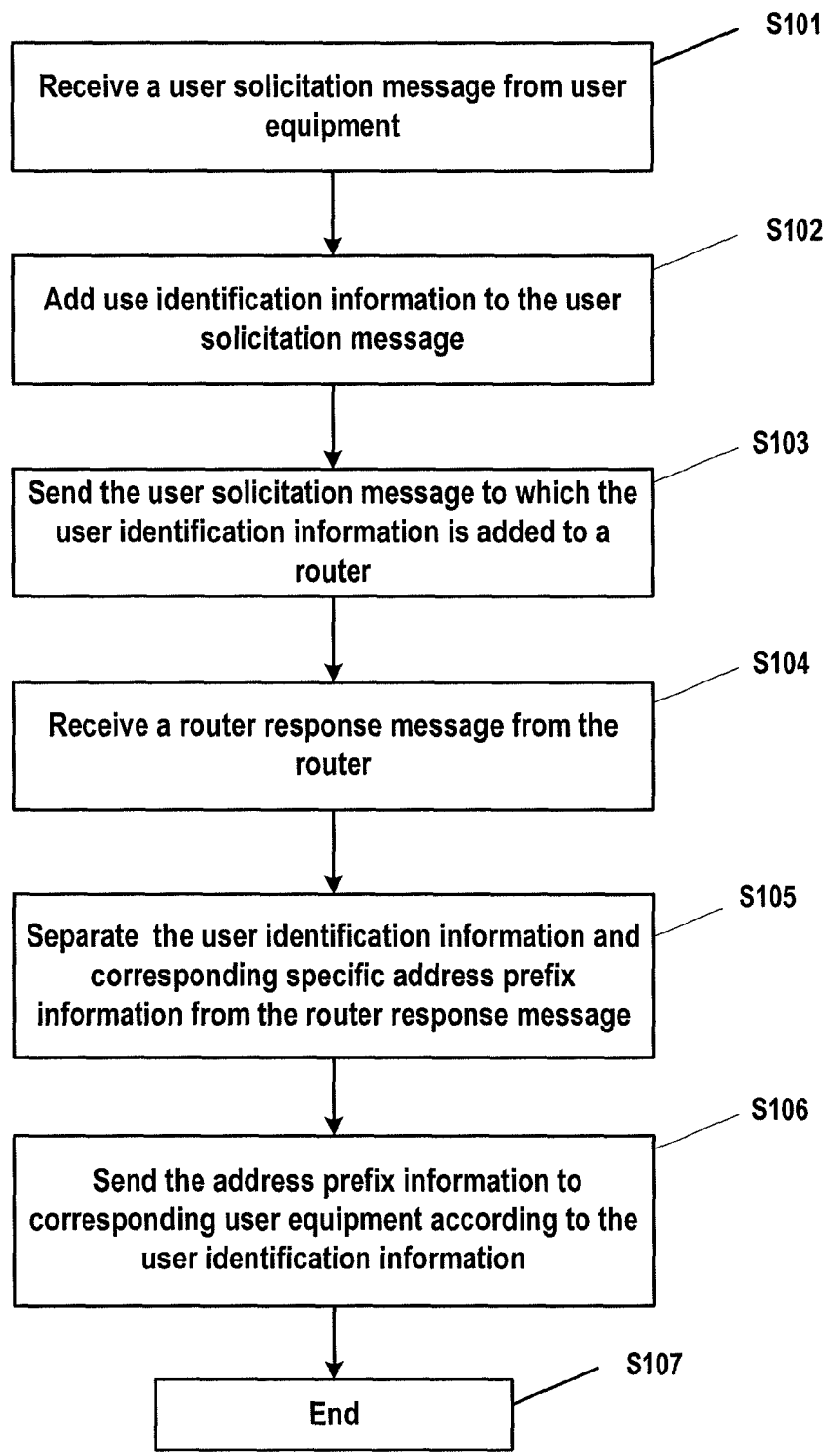
FIG. 6 is a flowchart of a method of implementing address configuration for user equipment in an access device of an access network according to an embodiment of the present invention.

FIG. 6 shows a flowchart of a method of implementing address configuration for user equipment in access device 2 in an IPv6 protocol-based communication network according to an embodiment of the present invention.

In step S101, a user solicitation message (e.g. a router solicitation (RS) message defined in RFC 2461) is received from user equipment.

In step S102, user identification information is added to the user solicitation message. The user identification information may contain relay agent ID representing access device 1 and a port identifier corresponding to the user equipment (or DSL).

In step S103, the user solicitation message to which the user identification information was added is sent to a routing device (e.g. edge router).

In step S104, a router response message (e.g. a router advertisement (RA) message defined in RFC 2461) is received from the routing device, which RA message contains user identification information (may contain a port identifier only or relay agent ID and a port identifier) and a particular address prefix corresponding to user equipment.

In step S105, the user identification information and the corresponding particular address prefix information are separated from the router response message. As described previously, the user identification information at least includes a port identifier for identifying user equipment (or DSL).

In step S106, the particular address prefix information is sent via a port indicated by the port identifier to corresponding user equipment in accordance with the user identification message.

Preferably, the access device 1 is a layer 2 access device with some layer 3 functionalities, and more preferably, is an Ethernet access device.

Preferably, the steps of combining a user identification message with a router solicitation message and separating the former from the latter can be implemented by adding the solution of option 6 shown in FIG. 3 to an IP neighbor discovery message (RS/RA message) defined in RFC 2461 as shown in 2A-2C or separating the former from the latter.

Figure 7:
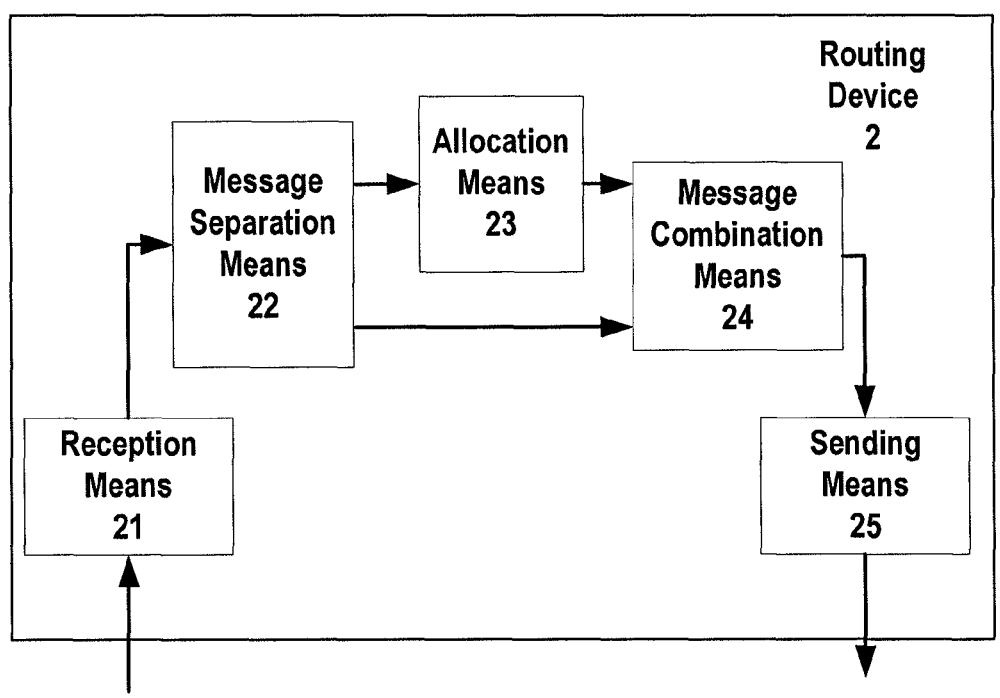
FIG. 7 is a block diagram of a routing device implementing address configuration for user equipment in an access network according to an embodiment of the present invention.

FIG. 7 shows a routing device 2 implementing address configuration for user equipment 3 in an IPv6 protocol-based communication network according to an embodiment of the present invention, which comprises reception means 21, message separation means 22, allocation means 23, message combination means 24, and sending means 25.

Reception means 21 is for receiving a user solicitation message (e.g. a router solicitation (RS) message defined in RFC 2461) from access device 2, wherein the RS message contains user identification information which may contain relay agent ID representing access device 1 and a port identifier corresponding to the user equipment (or DSL).

Message separation means 22 is for separating the user identification information from the user solicitation message.

Allocation means 23 is for allocating a corresponding particular address prefix (e.g. IPv6 address prefix) based on the user identification information (relay agent ID and port identifier).

Message combination means 24 is for adding the user identification information (may contain a port identifier only or relay agent ID and a port identifier) and the corresponding particular address prefix to a router response message (e.g. a router advertisement (RA) message defined in RFC 2461).

Sending means 25 is for sending the router response message to a corresponding access device based on the relay agent ID.

Preferably, access device 1 is a layer 2 access device with some layer 3 functionalities, and more preferably, is an Ethernet access device.

Preferably, message separation means 22 which separates the user identification message from the user solicitation message and message combination means 24 which adds the address prefix to the router response message can be implemented by adding the solution of option 6 shown in FIG. 3 to an IP neighbor discovery message (RS/RA message) defined in RFC 2461 as shown in 2A-2C or separating the former from the latter.

Figure 8:
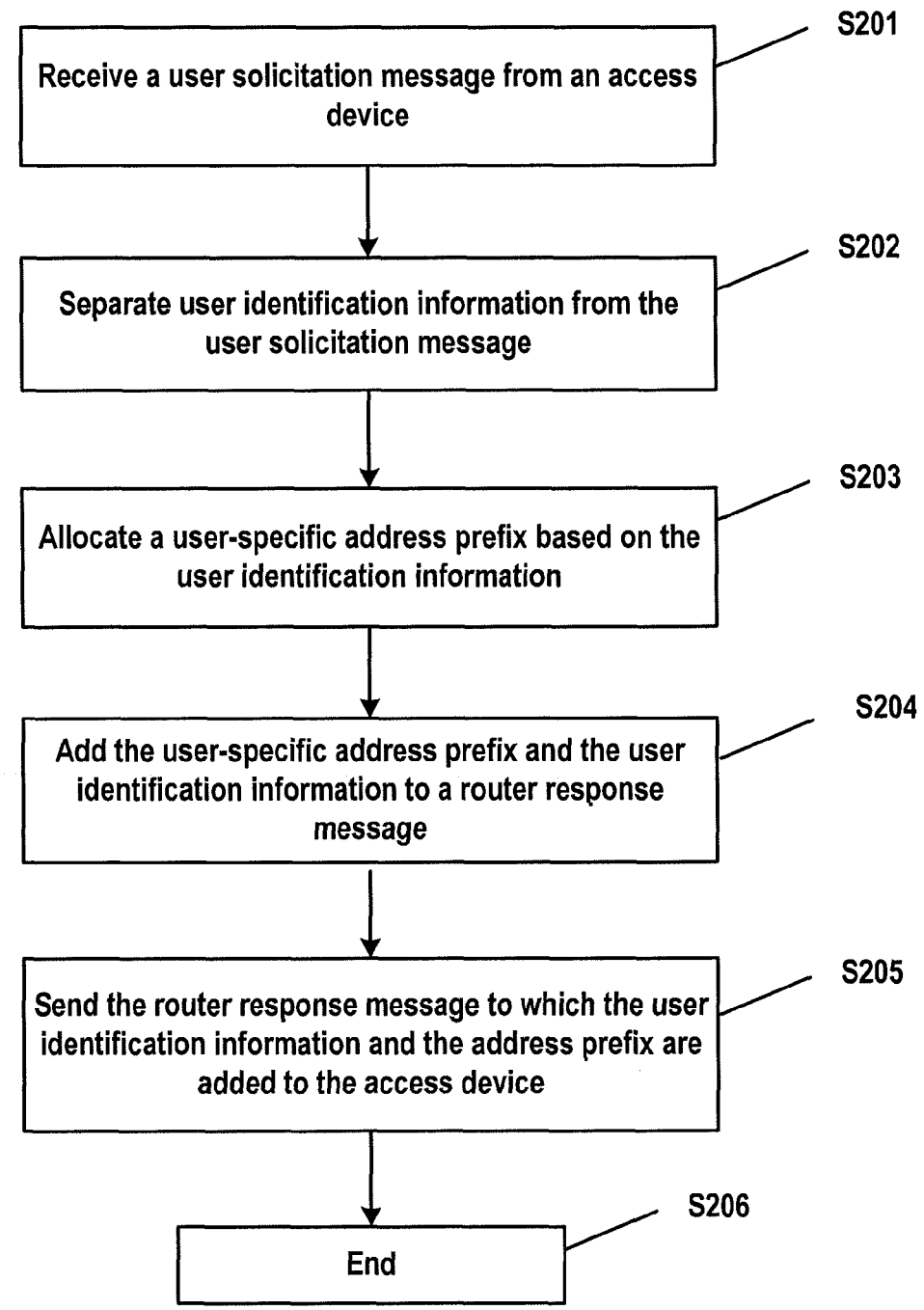
FIG. 8 is a flowchart of a method of implementing address configuration for user equipment in a routing device of an access network according to an embodiment of the present invention.

FIG. 8 shows a flowchart of a method of implementing address configuration for user equipment 3 in routing device 2 in an IPv6 protocol-based communication network, according to an embodiment of the present invention.

In step S201, a user solicitation message (e.g. router solicitation (RS) message defined in RFC 2461) is received from access device 2, wherein the RS message contains user identification information which may contain relay agent ID representing access device 1 and a port identifier corresponding to the user equipment (or DSL).

In step S202, the user identification information is separated from the user solicitation message.

In step S203, a corresponding particular address prefix (e.g. IPv6 address prefix) is allocated based on the user identification information (relay agent ID and port identifier).

In step S204, the user identification information (may contain a port identifier only or relay agent ID and a port identifier) and the particular address prefix are added to a router response message (e.g. a router advertisement (RA) message defined in RFC 2461).

In step S205, the router response message is sent to a corresponding access device based on the relay agent ID.

Preferably, access device 1 is a layer 2 access device with some layer 3 functionalities, and more preferably, is an Ethernet access device.

Preferably, step S202 of separating the user identification message from the user solicitation message and step S204 of adding the address prefix to the router response message can be implemented by adding the solution of option 6 shown in FIG. 3 to an IP neighbor discovery message (RS/RA message) defined in RFC 2461 as shown in 2A-2C or separating the former from the latter.

Compared with the prior art, the present invention allocates a dedicated address prefix for each user equipment (or DSL) by adding to an RS/RA message user identification information for indicating user equipment, thereby achieving stateless address configuration in IPv6 service and solving the security and scalability problem caused by applying the solutions of the prior art to an access network directly.

The concrete embodiments of the present invention have been described above. It is to be understood that the present invention is not limited to the specific embodiments. On the contrary, various variations or modifications can be made by those skilled in the art within the scope of the amended claims.

What is claimed is:

1. A method for address configuration in an access device in an IPv6 protocol supported communication network, the method comprising:
   receiving, at the access device, a user solicitation message from user equipment;
   adding, at the access device, user identification information identifying the user equipment to the user solicitation message, the user identification information including relay agent identification of the access device and a logic port identifier corresponding to the user equipment, to generate a solicitation message to which the user identification information is added;
   sending, by the access device, the solicitation message to which the user identification information is added; and
   receiving, at the access device, a first router response message, the first router response message including the user identification information and a user-specific address prefix that is based on the user identification information.

2. The method according to claim 1, further comprising:
   separating, at the access device, the user-specific address prefix and the user identification information from the first router response message to obtain a second router response message, the second router response message including the user-specific address prefix and excluding the user identification information; and
   sending, by the access device, the second router response message to the user equipment according to the user identification information.

3. The method according to claim 1, wherein the access device is an Ethernet access device.

4. An access device for address configuration for user equipment in an IPv6 protocol supported communication network, the access device comprising:
   a first reception device for receiving a user solicitation message from user equipment;
   a message combination device for adding user identification information identifying the user equipment to the user solicitation message, to generate a solicitation message to which the user identification information is added;
   a first sending device for sending the solicitation message to which the user identification information is added, to an edge router, the user identification information including relay agent identification of the access device and a logic port identifier corresponding to the user equipment; and
   a second reception device for receiving a router response message including the user identification information and a user-specific address prefix that is based on the user identification information.

5. The access device according to claim 4, characterized by further comprising:
   a message separation device configured to separate the user-specific address prefix and the user identification information from the first router response message to obtain a second router response message, the second router response message including the user-specific address prefix and excluding the user identification information; and
   a second sending device configured to send the second router response message to the user equipment according to the user identification information.

6. The access device according to claim 4, wherein the access device is an Ethernet access device.

7. A method for address configuration in a routing device of an IPv6 protocol supported communication network, the method comprising:
   receiving a user solicitation message;
   separating user identification information from the user solicitation message, the user identification information including relay agent identification of an access device and a logic port identifier corresponding to the user equipment;
   allocating a user-specific address prefix based on the user identification information;
   adding the user-specific address prefix and the user identification information to a router response message; and
   sending the router response message to which the user identification information and the user-specific address prefix are added.

8. The method according to claim 7, wherein the access device is an Ethernet access device.

9. A routing device for address configuration for user equipment in an IPv6 protocol supported communication network, the routing device comprising:
   a reception device configured to receive a user solicitation message;
   a message separation device configured to separate user identification information from the user solicitation message, the user identification information including relay agent identification of an access device and a logic port identifier corresponding to the user equipment;
   an allocation device configured to allocate a user-specific address prefix based on the relay agent identification and the port identifier;
   a message combination device configured to add the user-specific address prefix, the relay agent identification and the port identifier to a router response message; and
   a sending device configured to send the router response message to which the user identification information and user-specific address prefix are added.

10. The routing device according to claim 9, wherein the access device is an Ethernet access device.

* * * * *